Jan. 1, 1924
A. B. MUELLER
CLAMP
Filed Sept. 9, 1921
1,479,476
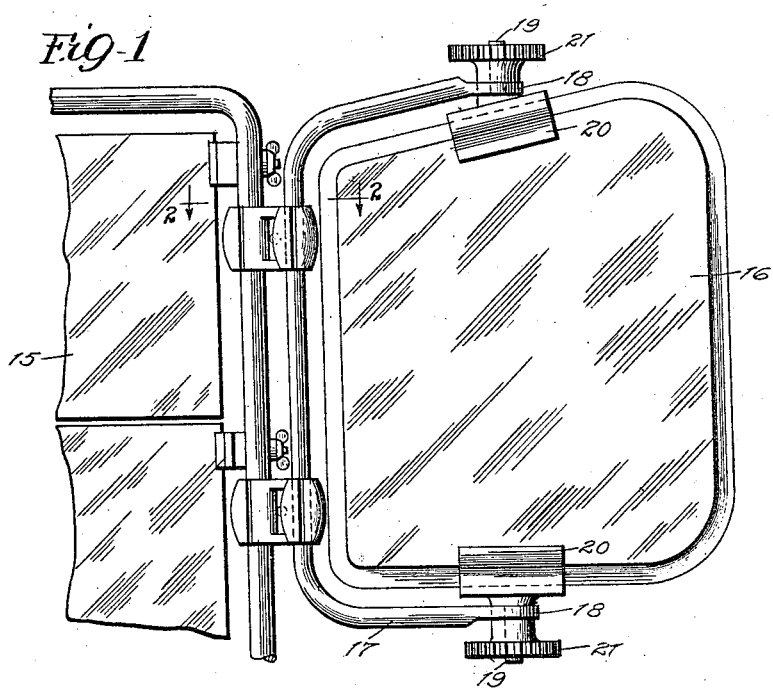
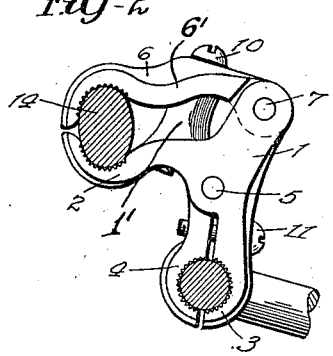
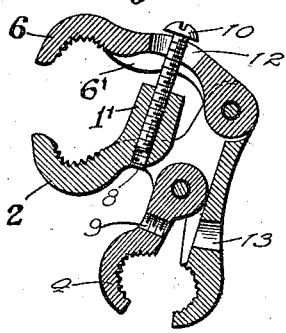
Inventor:-
ALBERT B. MUELLER.

Patented Jan. 1, 1924.

1,479,476

UNITED STATES PATENT OFFICE.

ALBERT B. MUELLER, OF CHICAGO, ILLINOIS.

CLAMP.

Application filed September 9, 1921. Serial No. 499,525.

*To all whom it may concern:*

Be it known that I, ALBERT B. MUELLER, citizen of the United States, residing at Chicago, in the county of Cook and State of Illinois, have invented a certain new and useful Improvement in Clamps, of which the following is a full, clear, concise, and exact description.

My invention relates to clamps and is of particular service in coupling supplemental transparent wind shields of glass or other suitable material with main transparent wind shields also formed of glass or other transparent material, these wind shields being provided with frames or mountings whereby they may be assembled by means of the clamps of my invention. The frame of the main wind shield and the clamps are so interrelated that the clamps may not move thereupon when applied thereto, a result which is preferably accomplished by making the frame of the main wind shield of a cross section which is longer than wide, the space enclosed by the jaws embracing this frame being similarly dimensioned. The frame or mounting of the supplemental wind shield is preferably circular and the space enclosed by the clamping jaws engaging this supplemental wind shield frame being substantially equally dimensioned or preferably circular so that the position of the supplemental wind shield frame and the supplemental wind shield supported thereby may be bodily shifted. The supplemental wind shield is also desirably adjusted to turn within its frame so that after having been bodily positioned it may be further adjusted by turning it.

While the clamp of my invention is especially adapted to the use which has been particularly set forth, I do not wish to be limited to any particular use to which the clamp may be put.

I will explain my invention more fully by reference to the accompanying drawing in which Fig. 1 is a view illustrating a portion of a main wind shield structure and a supplemental wind shield structure which are coupled by means of two clamps of my invention; Fig. 2 is a sectional view on line 2—2 of Fig. 1; and Fig. 3 is a sectional plan view taken at the middle of one of the clamps when removed and in unclamping adjustment.

Like parts are indicated by similar characters of reference throughout the different figures.

The clamp of my invention includes a body portion 1 having two clamping jaws 2, 3 carried thereby, these jaws being preferably rigid with respect to each other and with respect to the body portion carrying it, said body portion and jaws being preferably formed in one integral casting. An additional clamping jaw 4 is pivoted at 5 upon the body portion 1, the space enclosed by these jaws when they are in clamping position being equally dimensioned and preferably substantially circular. Another clamping jaw 6 is pivoted at 7 upon the aforesaid body portion 1, the space enclosed by the jaws 2 and 6, when they are in clamping position, being preferably longer than wide and desirably substantially elliptical. The pivoted edge 4 is disposed between the fixed jaws 2 and 3. The fixed jaw 2 is disposed between the pivoted jaws 4 and 6. The jaws 2 and 4 are respectively formed with threaded screw holes 8 and 9 adapted to receive clamping screws 10 and 11 whose heads respectively engage the exterior surfaces of the pivoted clamping jaw 6 and the rigid clamping jaw 3, the screws freely passing through slots 12 and 13 that are sufficiently narrow to prevent the screw heads from passing therethrough and are sufficiently long to permit the swinging movements of the pivoted jaws without causing the screws to bind in the openings through which they freely pass. The body portion 1 has an extension 1' in the region of the fixed jaw 2 and projecting toward the jaw 6. The outer end of this extension is received between wings 6' (on the sides of the jaw 6 and projecting toward the jaw 2) when the clamp is in clamping adjustment whereby the jaws and the object held thereby are most firmly held in movable relation, the extension 1' and the wings 6' cooperating with the clamping screw 10 and the pivot pin of the jaw 6 to this end. When the clamp of my invention is constructed as described the complemental clamping jaws 2 and 6 may be applied to the frame 4 of a main wind shield 15, this frame being elliptical in cross section to correspond to the clamping space between said jaws 2 and 6 whereby these jaws cannot turn upon the main frame in which they are applied so that the body portion 1 of each clamping structure thus applied to the main wind shield frame is fixed with respect to such frame.

The supplemental wind shield 16 has a frame or bail 17 that is preferably circular in cross section so as to be rotatable within the clamping space of the complemental clamping jaws 3 and 4. As illustrated, there are two clamping structures applied to one upright side of the main wind shield frame, it being understood that it is customary to similarly apply clamping structures to the upright side of the main wind shield frame.

When the clamping jaws 3 and 4 are loose the supplemental wind shield frame 17 may be turned to the position that it is to occupy whereby the screws 11 are tightened to hold it in this position. The ends of the frame 17 are formed eyes 18 through which stub shafts 19 are passed, these stub shafts being carried by clamps 20 that grip the supplemental wind shield 16. Clamping nuts 21 are threaded upon the shafts 20. When these nuts are loosened the wind shield 16 may be turned upon the upright axis defined by the eyes 18 and the stub shafts 19. When the supplemental shield 16 has been turned to the desired angle with respect to this frame 17, the nuts 21 may be tightened. I have thus produced a clamp which is adapted to hold an enclosing supplemental wind shield frame in selected positions, permitting location of the supplemental wind shield in various positions without obstructing the line of vision therethrough, the supports for the supplemental wind shield at the ends of the supplemental wind shield frame provided for the adjustment of the wind shield still without obstructing the line of vision.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

A clamp structure including a body portion having two clamping jaws located thereon abreast; an additional clamping jaw pivoted upon said body portion and complemental to one of the first aforesaid clamping jaws; another additional clamping jaw also pivoted upon said body portion and complemental to the other one of the first aforesaid clamping jaws; and a clamping screw for each pair of complemental clamping jaws, one of the pivoted clamping jaws being formed with wings upon its sides that project toward the other clamping jaw and said body portion having an extension adjacent this other clamping jaw that receives the screw pertaining to these two jaws and which extension is receivable between said wings in the clamping operation.

In witness whereof, I hereunto subscribe my name this 7th day of September A. D., 1921.

ALBERT B. MUELLER.